(12) United States Patent
Ozaki et al.

(10) Patent No.: US 7,077,932 B2
(45) Date of Patent: Jul. 18, 2006

(54) METHOD OF MAKING SHEET ELECTRODE FOR ELECTRIC DOUBLE LAYER CAPACITOR AND ROLLER ROLLING MACHINE SUITABLE FOR USE THEREIN

(75) Inventors: Kouki Ozaki, Aichi (JP); Masanori Tsutsui, Aichi (JP); Manabu Iwaida, Saitama (JP); Shigeki Oyama, Saitama (JP); Kenichi Murakami, Saitama (JP)

(73) Assignees: Daido Metal Company, Ltd., Aichi (JP); Honda Motors Co., Ltd., Tokyo (JP)

(*) Notice: Subject to any disclaimer, the term of this patent is extended or adjusted under 35 U.S.C. 154(b) by 77 days.

(21) Appl. No.: 10/724,360

(22) Filed: Dec. 1, 2003

(65) Prior Publication Data

US 2004/0164441 A1    Aug. 26, 2004

(30) Foreign Application Priority Data

Nov. 29, 2002   (JP) .............................. 2002-347940

(51) Int. Cl.
*D21F 11/00* (2006.01)

(52) U.S. Cl. ...................... 162/138; 264/105; 264/104; 252/567; 429/129; 429/247; 131/365; 361/502; 361/324

(58) Field of Classification Search ................. 162/138; 252/567; 429/129, 247; 131/365; 361/502, 361/324; 264/105, 104; 425/294, 363

See application file for complete search history.

(56) References Cited

FOREIGN PATENT DOCUMENTS

| JP | 2-235320 | 9/1990 |
|---|---|---|
| JP | 2000-150321 | 5/2000 |

*Primary Examiner*—Mark Halpern
(74) *Attorney, Agent, or Firm*—Browdy and Niemark, PLLC

(57) ABSTRACT

A sheet electrode with a predetermined thickness for an electric double layer capacitor is made by carrying out a roller rolling step in which a long sheet intermediate is made from a material containing a carbonaceous powder, a conductive assistant and a binder and thereafter. The sheet intermediate is passed between a pair of rolling rollers to be wound up by a winding section while being drawn out of a drawing section. The roller rolling step includes drawing the sheet intermediate out of the drawing section under a predetermined tension applied to the sheet intermediate, and controlling a widthwise position of the sheet intermediate immediately before the rolling rollers by an edge position controller, and winding the sheet intermediate rolled by the rollers onto a winding section while the winding section is applying a predetermined pressure to a rolling side drive roller located adjacent to the winding section and rotated at a predetermined speed.

2 Claims, 2 Drawing Sheets

METHOD OF MAKING SHEET ELECTRODE FOR ELECTRIC DOUBLE LAYER CAPACITOR AND ROLLER ROLLING MACHINE SUITABLE FOR USE THEREIN

BACKGROUND OF THE INVENTION

1. Field of the Invention

This invention relates to a method of making a sheet electrode for an electric double layer capacitor by rolling a sheet intermediate using rollers and a roller rolling machine suitable for use in the method.

2. Description of the Related Art

Electric double layer capacitors have a large capacity and an excellent charge and discharge cycle property. Therefore, their application to various appliances has been examined. The application includes backup power supplies for various electronic devices and batteries for means of transportation such as automobiles.

The above-mentioned electric double layer capacitors include a cylindrical type. In the cylindrical electric double layer capacitor, a pair of positive and negative electrodes each comprise a sheet electrode (polarizable electrode) held on a collecting electrode such as aluminum foil. The paired electrodes are wound into a coil with a separator interposed therebetween. The wound paired electrodes are accommodated in a cylindrical case while being impregnated with electrolyte.

The aforesaid sheet electrode is obtained by kneading carbon powder such as activated carbon, conductive assistant such as carbon black, a binder such as fluorocarbon resin, a binding assistant comprising a liquid lubricant such as alcohol, thereby obtaining a kneaded material. The kneaded material is formed into the aforesaid sheet electrode. JP-A-2000-150321 discloses rolling the above-mentioned kneaded material with use of rollers. Furthermore, JP-A-2-235320 discloses another rolling method with use of rollers. The kneaded material is rolled by rollers to be formed into a preparatory intermediate having a thickness of 1 mm. The preparatory intermediate is dried so that the liquid lubricant is eliminated. Thereafter, the preparatory intermediate is re-rolled by the rollers to be formed into a sheet electrode having a thickness of 0.25 mm.

A long continuous sheet electrode is required in order that a cylindrical electric double layer capacitor with a large capacity as described above may be made. Furthermore, the sheet electrode is desired to have a sufficiently small thickness and a sufficient accuracy. However, the material comprising activated carbon as a main component has a low strength and accordingly, ends of the sheet electrode are easy to be broken or cracked. Thus, it is difficult to make a sufficiently thin and long sheet electrode by rolling. The above-cited JP-A-2-235320 further discloses that an end of the preparatory intermediate is placed on an end of another intermediate so that the rolled sheet electrode is rendered longer. However, this manner complicates the rolling.

SUMMARY OF THE INVENTION

Therefore, an object of the present invention is to provide a method of stably making a sufficiently thin and long sheet electrode for the electric double layer capacitor by roller rolling.

Another object of the invention is to provide a roller rolling apparatus suitable for use in the method.

The inventors repeated trial and error in order to desirably carry out the roller rolling to stably manufacture a long sheet electrode with a small thickness but without breakage and crack together with study of materials. As a result, the inventors invented a method which is suitable for roller rolling.

The present invention provides a method of making a sheet electrode with a predetermined thickness for an electric double layer capacitor by carrying out rolling in which a long sheet intermediate is made from a material containing a carbonaceous powder, a conductive assistant and a binder and thereafter, the sheet intermediate is passed between a pair of rolling rollers to be wound up by a winding section while being drawn out of a drawing section. The roller rolling includes drawing the sheet intermediate out of the drawing section under a predetermined tension applied to the sheet intermediate, and controlling a widthwise position of the sheet intermediate immediately before the rolling rollers by an edge position controller, and winding the sheet intermediate rolled by the rollers onto a winding section while the winding section is applying a predetermined pressure to a rolling side drive roller located adjacent to the winding section and rotated at a predetermined speed.

In the above-described method, the sheet intermediate is drawn from the drawing section under the predetermined tension applied thereto. Consequently, the sheet intermediate can be fed continuously to the rolling roller side while being prevented from occurrence of crack or the like due to excessively large or small tension. Furthermore, the drawn sheet intermediate is passed between the rolling rollers to be rolled while the widthwise position of the intermediate is controlled by the edge position controller. Consequently, the sheet intermediate can be rolled stably while the edge of the intermediate can be prevented from being bent thereby to be partially overlapped and from occurrence of breakage, crack or the like.

On the other hand, in the winding section, the winding roller is not directly driven to wind the sheet electrode, but the sheet electrode is wound up on the winding roller while the winding roller is pressed against a winding side drive roller by a predetermined pressure. Accordingly, even when a diameter of a roll of wound sheet electrode varies or gradually increases, a predetermined winding speed can be maintained or the sheet electrode can be wound under a predetermined tension applied thereto. Thus, the sheet electrode can be wound stably while crack, tear or the like can be prevented.

Thus, although a material (sheet intermediate) containing a carbonaceous powder such as activated carbon as a main composition has a low strength or is brittle, the rolling can be carried out stably and consequently, a continuous long sheet electrode having a sufficient thickness and accuracy can be manufactured stably.

When previously made from a forming material, a long sheet intermediate can be made into a sufficiently thin sheet electrode in the subsequent roller rolling step. An experimental apparatus made by the inventors shows that a sheet electrode having suitable dimensions was obtained when a sheet intermediate having a thickness of about 200 µm was rolled two or three times into the sheet electrode with a thickness of 160 µm.

Activated carbon is primarily used as the carbonaceous powder made into a forming material. However, a carbon nanotube or fibrous carbon may be used as the carbonaceous powder, instead. Carbon black is primarily used as the conductive assistant. However, a fine particle of high conductive metal may be used as the conductive assistant, instead. A fluororesin powder such as polytetrafluoroethylene (PTFE) can be used as the binder.

In making the forming material, the above-noted components are desirably mixed at a suitable mixing ratio, kneaded and then pulverized to be granulated so as to have a suitable particle size distribution. Subsequently, a suitable amount of binding assistant is added so that a forming material suitable for the previous forming can be obtained. The binding assistant may include alcohol such as isopropyl alcohol, ether, ketone or the like.

The present invention also provides a roller rolling machine rolling the aforesaid sheet intermediate into a sheet electrode with a predetermined thickness for an electric double layer capacitor. The apparatus comprises a tension control device controlling a tension of the sheet intermediate drawn out of the drawing section so that the tension is constant, an edge position control device controlling a widthwise position of the sheet intermediate located immediately before the rolling rollers, a winding side drive roller located adjacent to the winding section so as to be rotated at a predetermined speed, and a pressing element applying a predetermined pressure to the winding side drive roller so that the winding section is pressed against the drive roller.

Although a material (sheet intermediate) containing a carbonaceous powder such as activated carbon as a main composition has a low strength or is brittle as described above, the rolling can be carried out stably and consequently, a continuous long sheet electrode having a sufficient thickness and accuracy can be manufactured stably. Thus, the apparatus is suitable for carrying out the above-described method.

BRIEF DESCRIPTION OF THE DRAWINGS

Other objects, features and advantages of the present invention will become clear upon reviewing the following description of the embodiment, made with reference to the accompanying drawings, in which.

DETAILED DESCRIPTION OF THE INVENTION

Figure 1:
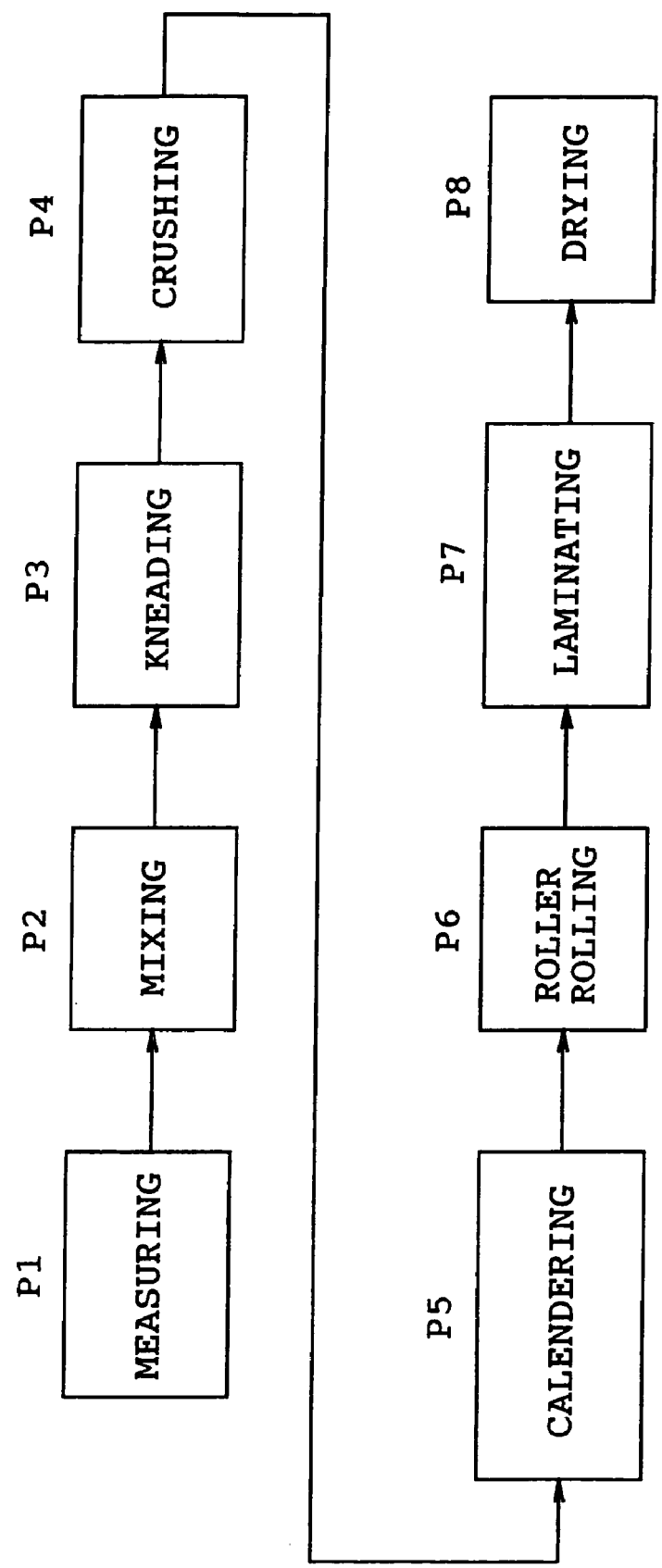
FIG. 1 schematically illustrates an overall process of manufacturing the sheet electrode in accordance with an embodiment of the present invention.

An embodiment of the present invention will be described with reference to the drawings. Referring to FIG. 1, an overall process of manufacturing a sheet electrode for an electric double layer capacitor is schematically shown. In the embodiment, sheet electrodes manufactured by the method of the present invention are bonded to both sides of a long aluminum foil serving as a collector electrode respectively, whereby an electrode sheet is manufactured. The electrode sheet is then dried into a product. The embodiment covers as far as the drying process. The aforesaid electrode sheet has a length of some hundreds meters. The electrode sheet is used, for example, as a material for a cylindrical electric double layer capacitor of large capacity type. In the following description, a polarizable electrode of the cylindrical double layer capacitor will be referred to as "sheet electrode." The aluminum foil having both sides to which the sheet electrodes are bonded respectively will be referred to as "electrode sheet."

Manufacturing the electrode sheet includes a measuring process P1, a mixing process P2, a kneading process P3, a crushing process P4, a calendering process P5, a roller rolling process P6, a laminating process P7 and a drying process P8 all of which are carried out sequentially. Each process will be described in brief.

Firstly, materials used for manufacture of the sheet electrode are each measured in the measuring process P1. The materials include activated carbon serving as a carbonaceous powder, fine powder of carbon black serving as an electrically conductive assistant, and PTFE powder serving as a binder. The activated carbon, carbon black and PTFE are in the ratio of 8:1:1, for example. Furthermore, isopropyl alcohol (hereinafter, "IPA") is used as a binder assistant in the embodiment.

In the mixing process P2, the activated carbon and carbon black are mixed together using a mixer. In the mixing, measured activated carbon and carbon black are put into a container of the mixer. An agitating blade is rotated for a predetermined period of time so that fine powder of carbon black is distributed uniformly among the activated carbon particles. Furthermore, PTFE and IPA are put into the container, and the agitating blade is rotated for the mixing purpose. As a result, the activated carbon and the carbon black are mixed further uniformly so that fine powder of carbon black is distributed uniformly among the activated carbon particles and so that PTFE is fiberized thereby to entwine the activated carbon and carbon black.

In the kneading process P3, a mixture obtained in the mixing process P2 is kneaded by a kneader. A container of the kneader is filled with the mixture and then closed by a cover. A blade is then driven while the mixture is pressurized. Temperatures of the container, the cover and the blade of the kneader are controlled so as to be maintained at about 90° C., for example. Furthermore, the hardness of a kneaded substance is also controlled. Consequently, PTFE is further fiberized to further entwine the activated carbon and the carbon black, whereupon the kneaded substance presents a state just like a lump of rubber.

In the crushing process P4, the kneaded substance obtained in the kneading process P3 is crushed into fine grain (crushed grain). In this step, the kneaded substance is put into a container of a crushing machine and a crushing blade is rotated so that the kneaded substance is crushed.

In the calendering process P5, a long sheet intermediate is previously made from a forming material comprising the aforesaid crushed grain. The forming material is put into a hopper of a calendering machine. The forming material fed out of the output section of the hopper is made by two calender rolls into a continuous plate-shape. The obtained sheet intermediate is wound up by a winding roller. The obtained sheet intermediate has the thickness of about 200 µm.

In the subsequent roller rolling process P6, the aforesaid sheet intermediate 22 is continuously rolled by a roller rolling machine 26 in accordance with the present invention, whereby a long sheet electrode 27 with a predetermined thickness (160 µm, for example) is manufactured. In the embodiment, the roller rolling process is repeatedly carried out a plurality of times (two or three times). In the final process, opposite edges of the sheet electrode 27 are cut off so that the sheet electrode has a predetermined width. This process is also referred to as "slitting process." The roller rolling process P6 and the roller rolling machine 26 will be described in detail later.

In the laminating process P7, two sheets of aluminum foil serving as collector electrodes are laminated onto both sides of the sheet electrode 27 by a laminator, whereby an electrode sheet is formed. In the subsequent drying process P8, a roll of wound electrode sheet is drawn out to be passed through a drying chamber for the drying purpose. In this case, hot air produced by a heater is supplied into the drying chamber. IPA and most of water contained in the sheet electrode 27 are eliminated in the drying process. Vacuum drying may also be carried out, if required.

Figure 2:
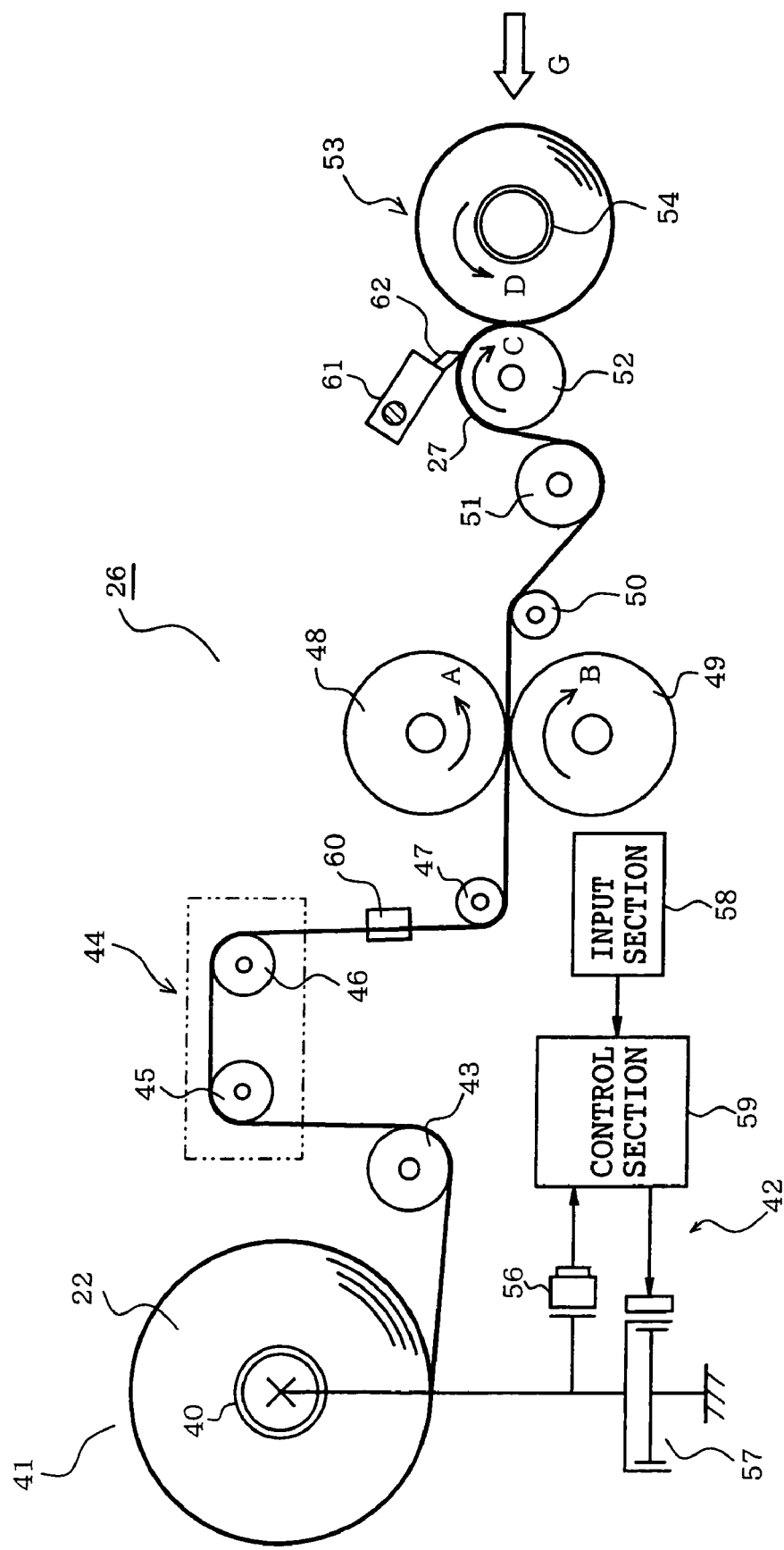
FIG. 2 is a schematic front view of the construction of the roller rolling machine in accordance with the embodiment of the invention.

The roller rolling process P6 and the roller rolling machine 26 will now be described in detail with particular reference to FIG. 2. FIG. 2 schematically illustrates the construction of the roller rolling machine 26 in accordance with the embodiment of the invention. The roller rolling machine 26 includes a drawing section 41 constituting a left-hand end thereof as viewed in FIG. 2. A bobbin 41 of a rolled sheet intermediate 22 is set in the drawing section 41. The drawing section 41 is provided with a tension controller 42 serving as a tension controlling unit as will be described in detail later. The roller rolling of the sheet intermediate 22 is repeatedly carried out a plurality of times so that a sheet electrode 27 is manufactured. Although the sheet electrode 27 is obtained after execution of a final roller rolling, any intermediate product under rolling process will also be referred to as the "sheet intermediate 22" when such an intermediate product need not be distinguished from the sheet intermediate.

The sheet intermediate 22 drawn from the drawing section 41 is caught on a guide roller 43 and thereafter passes through two tracking rollers 45 and 46 of an edge position controller 44 which will be referred to as "EPC." The sheet intermediate 22 is introduced via a guide roller 47 between a pair of upper and lower rolling rollers 48 and 49. The rolling rollers 48 and 49 are rotated by electric motors (not shown) in the directions of arrows A and B at predetermined speeds respectively, so that the sheet intermediate 22 is passed between the rollers 48 and 49 thereby to be rolled.

An article rolled by the rolling rollers 48 and 49 or the sheet intermediate 22 passes guide rollers 50 and 51 in turn and further passes a driving roller 52 provided at the winding side to be rotated by an electric motor or the like, whereupon the sheet intermediate is wound onto a winding bobbin 54 of a winding section 53. In this case, the sheet intermediate 22 is rolled up by touch roll. Furthermore, a cutting blade 62 constituting a slitting unit is provided near the driving roller 52.

The tension controller 42 comprises a proximity switch 56 detecting rotation of a shaft of the drawing section 41 in which the bobbin 40 is to be set, a powder brake 57 braking the shaft of the drawing section, an input section 58 operated by an operator so that various set values such as tension, material thickness, initial winding diameter and the like are supplied into the tension controller, and a control section 59 controlling the powder brake 57 on the basis of the aforesaid set values and detection by the proximity switch 56.

The control section 59 obtains, by calculation, a rotational speed of the bobbin 40 from a detection signal delivered by the proximity switch 56. The control section 59 further obtains, by calculation, a current winding diameter from the calculated current rotational speed, the aforesaid initial winding diameter, and the aforesaid material thickness. Based on the obtained current winding diameter, the control section 59 obtains a braking force for achieving the set tension and controls the powder brake 57 so that the obtained braking force is applied to the shaft. Consequently, the tension controller 42 controls the tension of the sheet intermediate 22 drawn out of the drawing section 41 is maintained at a predetermined value.

The two parallel tracking rolls 45 and 46 of EPC 44 are supported on a moving frame, which is rockable about the center of the in-feed side tracking roll 45. An edge sensor 60 is provided in order to detect an edge (widthwise end) of the sheet intermediate 22 at the delivery side (at the side of the rolling rolls 48 and 49). Based on the result of detection by the edge sensor 60, the control section 59 controls a rocking position of the moving frame, whereby meander of the sheet intermediate 22 is corrected. Thus, the widthwise position of the sheet intermediate 22 (a biting position and angle of the sheet intermediate relative to the rolling rollers 48 and 49) is controlled immediately before the rolling rollers 48 and 49.

In the winding section 53, the rolled sheet intermediate 22 is wound onto the winding side driving roller 52 provided adjacent to the winding section 53 while being pressed by a predetermined pressure onto the winding bobbin 54 in a direction of void arrow G in FIG. 2. After having passed between the rolling rollers 48 and 49, the sheet intermediate 22 is caught on the driving roller 52 so as to adhere to an approximately upper half circumference of the roller, thereafter being wound onto the bobbin 54 at its lower side.

When the driving roller 52 is rotated in the direction of arrow C at a predetermined speed while the rolled sheet intermediate 22 is pressed against the driving roller 52 by a predetermined pressure, the bobbin 54 is rotated in the direction of arrow D so that the sheet electrode 27 is wound at a predetermined speed.

A slitting apparatus 61 serving as a slitting unit is provided over the driving roller 52 for cutting both widthwise ends of the sheet electrode 27 to be wound so that the sheet electrode has a predetermined width. When a slitting process is carried out with the roller rolling process, the slitting apparatus 61 is positioned so that an edge of a cutting blade 62 is pressed against the upper half part of the roller 52 to which the sheet electrode 27 is adherent. As a result, both widthwise ends of the sheet electrode 27 are cut at a location immediately before being wound on the bobbin 54 after the final roller rolling.

More specifically, the sheet electrode 27 obtained by the roller rolling sometimes has an irregular width and differences in the thickness in the widthwise ends thereof (a low density part) or cracks. Accordingly, it is preferred that both widthwise ends of the sheet electrode 27 are cut so that the sheet electrode has a predetermined width. The slitting process using a cutting blade 62 is carried out for the aforesaid purposes. When the cutting blade 62 is pressed against the sheet electrode 27 wound on the drive roller 52 to be cut, the stability of the sheet electrode 27 during the cutting can be improved such that the sheet electrode can smoothly be cut. Consequently, a dimensional accuracy can be improved, and an occurrence of crack at a cut portion can be prevented.

In the roller rolling process P6, roller rolling is carried out for the long sheet intermediate 22 formed at the calendering process P5, twice using the above-described roller rolling machine 26. More specifically, in the first rolling, the sheet intermediate 22 is set in the drawing section 41 and is caused to pass through rollers sequentially as shown in FIG. 2. The sheet intermediate 22 is then passed between the paired rolling rollers 48 and 49 to be rolled, thereafter being continuously wound up onto the winding section 53 as an intermediate rolled product.

In this case, the sheet intermediate 22 is drawn out from the drawing section 41 while being tensioned by the tension controller 42. As a result, crack or the like due to an excessively large or small tension can be prevented when the sheet intermediate 22 is continuously fed to the rolling rollers side. Furthermore, the drawn sheet intermediate 22 is passed between the rolling rollers 48 and 49 while the widthwise position thereof is under control by EPC 44. Consequently, the sheet intermediate 22 can be rolled stably while the edge of the intermediate can be prevented from being bent thereby to be partially overlapped and from occurrence of breakage, crack or the like.

In the winding section 53, the winding bobbin 54 is not directly driven to wind the sheet electrode, but the sheet electrode (rolled intermediate) is wound up on the winding bobbin 54 while the winding bobbin is pressed against a winding side drive roller 52 by a predetermined pressure (touch roll). Accordingly, even when a diameter of a roll of wound sheet electrode varies or gradually increases, a predetermined winding speed can be maintained or the sheet intermediate 22 or the sheet electrode 27 can be wound under a predetermined tension applied thereto. Thus, the sheet intermediate or the sheet electrode can be wound stably while crack, tear or the like can be prevented. In the first rolling, the cutting blade 62 is located at a retreated position from the contact of the drive roller 52 and accordingly the slitting process is not carried out.

Upon completion of the first rolling, an obtained intermediate rolled product is set in the drawing section 41 so that a second rolling is carried out in the same manner as the first rolling. In the second rolling, the cutting blade 62 of the slitting apparatus 61 is set at a predetermined position, and the slitting step is executed in which both edges of the sheet electrode 27 are cut off so that a predetermined width of the sheet is obtained. Consequently, an obtained long sheet electrode 27 has a predetermined thickness (160 µm, for example) and a predetermined width (120 mm, for example).

Thus, in spite of a low strength (high brittleness) of the material comprising activated carbon as a main component the sheet intermediate 22 can be rolled stably while crack, tear or the like is prevented. Consequently, a continuous long sheet electrode 27 having a sufficient thickness and accuracy can be manufactured stably. In the embodiment, the sheet intermediate 22 having a thickness of 200 µm can be formed into the sheet electrode having a thickness of 160 µm as the result of execution of the first and second rolling steps.

As obvious from the foregoing description of the embodiment, the long sheet electrode 27 for the electric double layer capacitor has a sufficient thickness and accuracy and can be manufactured stably. Additionally, the roller rolling machine 26 employed in the embodiment is suitable for execution of the above-described manufacturing method.

The roller rolling is repeated twice in the foregoing embodiment so that the obtained sheet electrode 27 has a desired thickness. The roller rolling may be carried out only once or three times or more. Furthermore, the slitting apparatus 61 is constructed so that the cutting blade is pressed against the drive roller 52. However, the cutting blade may be pressed against another guide roller provided at the winding side. Furthermore, an intended end can be achieved even when the slitting apparatus 61 is provided integrally on the roller rolling machine 26. Alternatively, a slitting apparatus having a different construction may be provided, instead. Thus, the construction of the roller rolling machine 26 may be changed. For example, the arrangement of the tension controller 42 or EPC 44 may be modified. Furthermore, various types of components may be combined or blended together regarding the forming material. Additionally, the processes other than the roller rolling process P6 are mere examples and may be partially changed or eliminated.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A method for making a sheet electrode with a predetermined thickness for an electric double layer capacitor comprising:
   a. producing a long sheet intermediate from a material containing a carbonaceous powder, a conductive assistant, and a binder;
   b. passing the long sheet intermediate between a pair of rolling rollers;
   c. winding the long sheet intermediate on a winding section while the long intermediate sheet is drawn out from a drawing section under a predetermined tension applied to the long sheet intermediate, and the width of the long sheet intermediate is controlled immediately prior to the rolling rollers by an edge position controller; and
   d. winding the long sheet intermediate onto a winding section under a predetermined pressure and at a predetermined speed to a rolling side drive roller located adjacent to the winding section.

2. The method according to claim 1, wherein while the long sheet intermediate is passed between the rolling rollers, both widthwise ends of the long sheet intermediate are slit so that the long sheet intermediate has a predetermined width, after which the rolled sheet intermediate is caught onto and adhered to a drive roller and a slitting blade is pressed against a part of the long sheet intermediate adhered to the drive roller.

* * * * *